US005344194A

United States Patent [19]
Hatagishi et al.

[11] Patent Number: 5,344,194
[45] Date of Patent: Sep. 6, 1994

[54] CONNECTORS WITH LEVER

[75] Inventors: Yuji Hatagishi; Naoto Taguchi, both of Shizuoka, Japan

[73] Assignee: Yazaki Corporation, Japan

[21] Appl. No.: 889,939

[22] Filed: Jun. 2, 1992

[30] Foreign Application Priority Data

Jun. 3, 1991 [JP] Japan ........ 3-041075[U]

[51] Int. Cl.[5] ........ H01R 13/62; F16L 35/00

[52] U.S. Cl. ........ 285/26; 285/320; 285/308; 285/311; 439/157; 439/310

[58] Field of Search ........ 285/26, 29, 51, 308, 285/312, 320, 311; 403/321, 322, 325, 116, 12, 13; 439/157, 160, 310

[56] References Cited

U.S. PATENT DOCUMENTS

| | | | |
|---|---|---|---|
| 729,479 | 5/1903 | Wittman | 285/320 X |
| 2,526,754 | 10/1950 | Johnson et al. | 285/320 X |
| 2,810,591 | 10/1957 | Jacoby | 285/320 X |
| 3,746,931 | 7/1973 | Muranaka | 439/160 X |
| 4,230,345 | 10/1980 | Boelkins | 285/320 X |
| 4,504,085 | 3/1985 | Sachleben, Sr. | 285/311 X |
| 4,641,859 | 2/1987 | Walters | 285/308 X |
| 4,647,075 | 3/1987 | Vargo | 285/312 X |
| 4,759,117 | 7/1988 | Brazell | 403/321 X |
| 4,954,923 | 9/1990 | Jullien | 439/160 X |
| 5,104,330 | 4/1992 | Yagi et al. | 439/157 |
| 5,135,408 | 8/1992 | Suzuki | 439/310 |
| 5,172,997 | 12/1992 | Hatagishi | 285/312 X |
| 5,174,785 | 12/1992 | Endo | 439/157 X |
| 5,230,635 | 7/1993 | Takenouchi et al. | 439/157 |

FOREIGN PATENT DOCUMENTS

| | | | |
|---|---|---|---|
| 0503078 | 7/1930 | Fed. Rep. of Germany | 285/308 |
| 2-56876 | 2/1990 | Japan . | |
| 0049019 | 8/1909 | Switzerland | 285/311 |
| 0141957 | 11/1930 | Switzerland | 285/311 |

*Primary Examiner*—Randolph A. Reese
*Assistant Examiner*—Heather Chun
*Attorney, Agent, or Firm*—Venable, Baetjer, Howard & Civiletti

[57] ABSTRACT

Connectors with a lever in which a pair of male and female connectors are mated with and disconnected from each other by rotating the lever. The lever having cam grooves and a lock portion is rotatably attached to the female connector. Cam pins are attached to the male connector. When both connectors are initially mated with each other, the cam pins engage with the cam grooves, and when the lever is rotated in a direction in which both connectors are mated with each other, the male connector moves toward the female connector. An elastic locking member is interposed between the lever and the female connector. An operational portion, reverse spring portions for urging the lever toward a direction opposite to that in which both connectors are mated, and lock spring portions to be engaged with the lock portion of the lever so as to maintain the lever in a locked position, are all integrally formed in the elastic locking member. The elastic locking member is elastically displaced by pressing the operational portion so as to disengage the lock portion of the lever from the lock spring portions of the elastic locking member. The reverse spring portions retain the lever in the released position. The locking member for locking the lever and the reverse spring portions for retaining the lever in a released position are integrally formed.

12 Claims, 10 Drawing Sheets

CONNECTORS WITH LEVER

BACKGROUND OF THE INVENTION

1. Field of the Invention

The present invention relates to connectors with a lever in which a pair of male and female connectors are mated with and disconnected from each other by the rotation of the lever. More particularly, it pertains to connectors, having a lever, which are mated with and disconnected from each other by a small force.

2. Description of the Related Art

As connectors have become diversified and the number of built-in terminals have increased, it requires a great force to connect male and female terminals together or to disconnect them from each other because of the contact resistance of the terminals, thus making it difficult for the connectors to be mated with and disconnected from each other. To solve such a problem, a pair of connectors are employed in which a lever having cam grooves is rotatably mounted on one connector, and cam pins engaging with the cam grooves are provided on the other connector. By the operation of the lever, more connectors can be mated with each other by a force much smaller than that usually required to mate male and female connectors.

An example of such connectors with a lever is disclosed in Japanese Patent Laid-Open Publication No . 2-56876. One connector is provided with a reverse spring for urging a lever toward a released position. Another connector is provided with a member for locking the rotation of the lever when both connectors are joined together. The locking member is provided separately from the latter connector (housing) so as to increase the life of a locking portion.

In the known conventional art utilizing the locking member separate from the connector, when the connectors are mated with each other, the locking member must be slid in a predetermined direction to either lock or release the lever. Two operations are required; the lever must be rotated, and the locking member must be slid . The locking member and the reverse spring are separate members, thus increasing the number of components and processes for assembling them. This in turn creates the problem of controlling components.

The present invention has been made in view of the above problems, and the object thereof is to provide connectors with a lever in which reverse springs and a member for locking the lever are integrally formed, and in which the lever can be rotated to mate a male connector with a female connector and locked simultaneously.

SUMMARY OF THE INVENTION

To achieve the above object, this invention provides connectors with a lever, which connectors have a structure in which the lever having cam grooves and a lock portion is attached to one of a pair of male and female connectors, and cam pins are attached to the other connector. The lever is rotated between locked and released positions. When both connectors are initially mated with each other, the cam pins engage with the cam grooves. The lever is rotated in a direction in which both connectors are mated with each other, thereby moving the one connector toward the, other connector. An elastic locking member is interposed between the lever and the one connector, in which member integrally formed are an operational portion, reverse spring portions for urging the lever toward a direction opposite to that in which both connectors are mated, and lock spring portions to be engaged with the lock portion so as to maintain the lever in a locked position. The elastic locking member is elastically displaced by pressing the operational portion so as to disengage the lock portion from the lock spring portions. The reverse spring portions retain the lever on the side of the released position.

In this invention, the elastic locking member is utilized in which the reverse spring portions, which urge the lever toward the direction opposite to that in which the connectors are mated, and the lock spring portions, which engage with the lock port ion of the lever so as to maintain it in a locked position, are integrally formed to lock or release the lever. The number of components and processes for assembling them are therefore decreased, and the trouble of controlling the components is reduced. By rotating the lever, the male and female connectors can be completely mated with each other and the lever locked simultaneously. Thus, one operation suffices to accomplish the above mating and locking operations, improving workability.

The present invention will be described below in detail with reference to the embodiments shown in the accompanying drawings.

DESCRIPTION OF THE PREFERRED EMBODIMENTS

Figure 1:
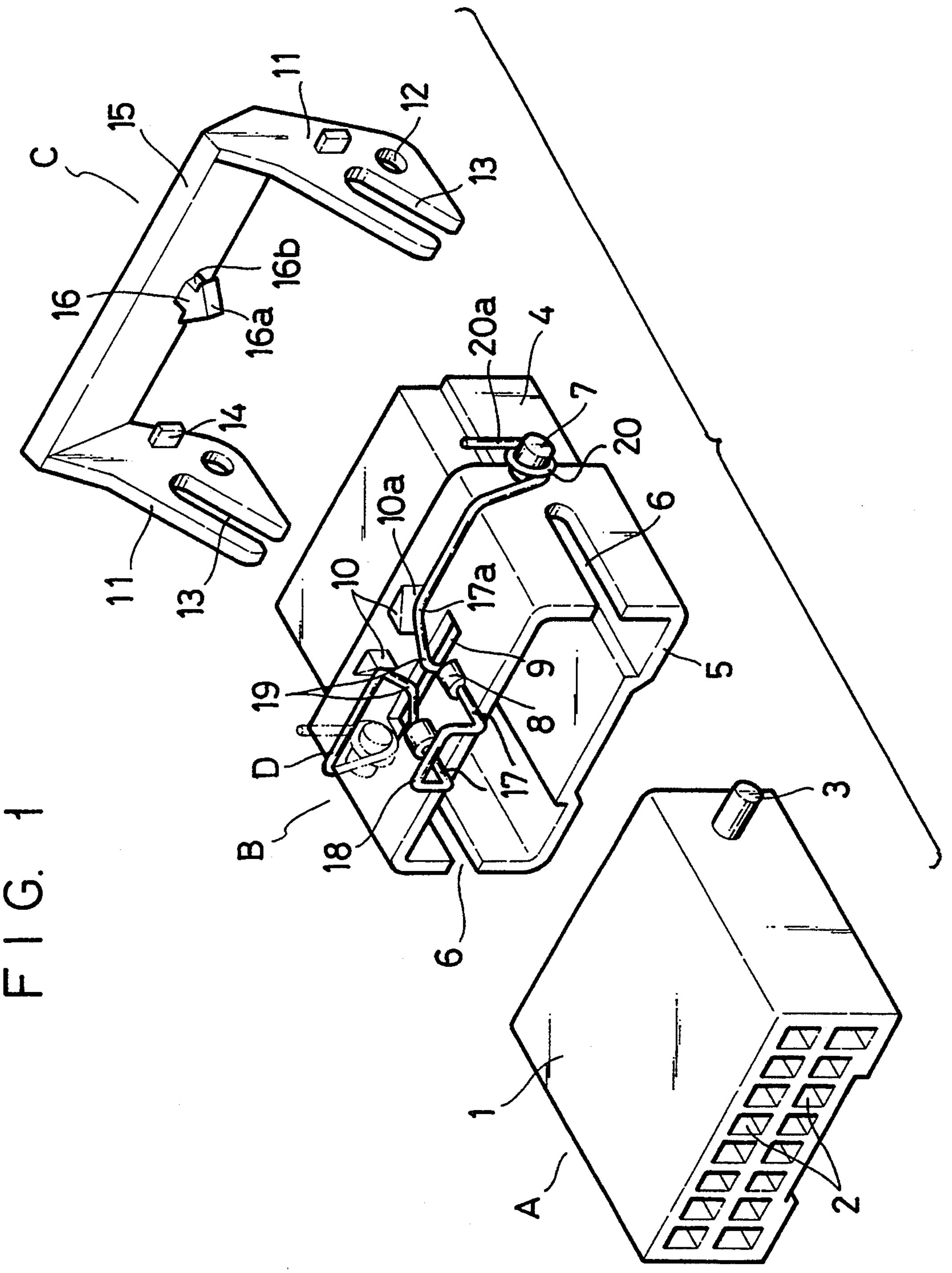
FIG. 1 is an exploded perspective view essentially showing a first embodiment of connectors with a lever.

Referring to FIG. 1, connectors with a lever of the present invention are composed of a male connector A, a female connector B, a lever member C for mating both connectors with each other and for disconnecting them, and an elastic locking member D for maintaining the lever in a locked position. The male connector A includes a synthetic resin-made housing 1, and contains a plurality of terminal accommodating chambers 2. Cam pins 3 project from front side walls of the housing 1. Female terminals (not shown) are accommodated in the chambers 2. The female connector B is equipped with a hood 5 in front of a housing 4 which accommodates male terminals corresponding to the female terminals. The hood 5, into which the male connector A is inserted, has pin guide grooves 6 formed in side walls thereof and a pin 7 which axially supports the lever member C and the elastic locking member D. A pair of spring-pressing arms 8 and 8, a window 9, and a pair of tapered spring guides 10 and 10 are provided on the upper outer surface of the hood 5. These components are formed in this order starting from the central front side of the hood 5.

The lever member C is formed in such a manner that the shoulder portions of a pair of facing levers 11 and 11 are connected together by a link plate 15, thus forming a U turned on its side when the lever member C is seen in section. Each lever 11 has a shaft hole 12 and a cam groove 13, one end of which opens. A stopper 14 projects from the inner surface of each lever 11, and stops a spring 20*a* of a reverse spring portion 20 of the elastic locking member D. An arrow-shaped lock piece 16, serving as a lock portion of the lever member C, projects from the undersurface of the link 15 . The elastic locking member D has a structure in which an operational portion 18, lock spring portions 19 and 19, and a pair of reverse spring portions 20 and 20 are connected to one another. An elastic metal wire having a predetermined length is bent so as to be symmetrical. In other words, the central portion of the elastic metal wire is first bent in the shape of an inverted U, thus forming a pair of parallel leg portions 17 and 17. The U portion at the ends of the leg portions 17 and 17 becomes an inverted U portion by bending each leg portion upwardly at right angles. The leg intermediate portions are bent inwardly in the shape of cones, thus forming the lock spring portions 19 and 19 having a small gap therebetween. The ends of the leg portions 17 and 17 are bent outwardly at bent portions 17*a* and 17*a*. The reverse spring portions 20, similar to torsional coiled springs, are formed at the free ends of the metal wire .

Figure 2A:
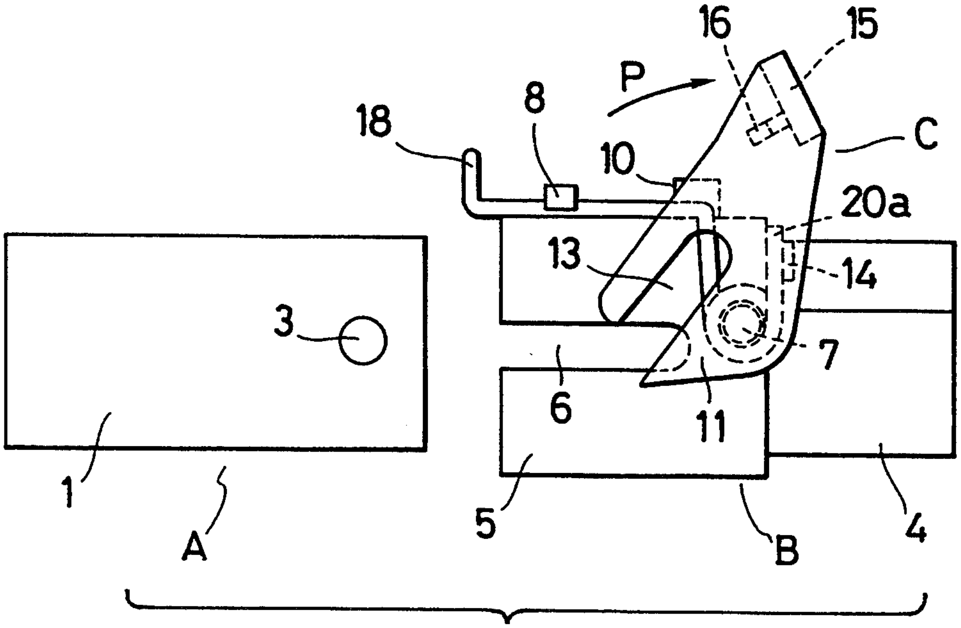
FIG. 2A is a side view illustrating how male and female connectors shown in FIG. 1 are disconnected from each other.

The connectors having the lever are assembled in the following manner. As regards the hood 5 of the female connector B, the leg portions 17 and 17 of the lock spring portions 19 are fitted into the spring-pressing arms 8 and 8. The reverse spring portions 20 and 20 are fitted on the pins 7 and 7 on both sides of the hood 5. The pair of levers 11 and 11 of the lever member C are first flexibly expanded outwardly, and then the pins 7 are inserted into the shaft holes 12. Because of such an operation, as shown in FIG. 2A, the lever member C is axially supported so as to rotate with respect to the hood 5. The reverse spring portions 20 of the elastic locking member D come to engage with the stoppers 14 on the inner surfaces of the levers 11, and are urged toward a released position as indicated by the arrow P. The lever member C is thus maintained upright. As regards the elastic locking member D, the lock spring portions 19 and 19, having a small gap therebetween, are positioned on the window 9, and the bent portions 17*a* are in contact with the tapered surfaces 10*a* of the spring guides 10 on the upper surface of the hood 5.

Figure 2B:
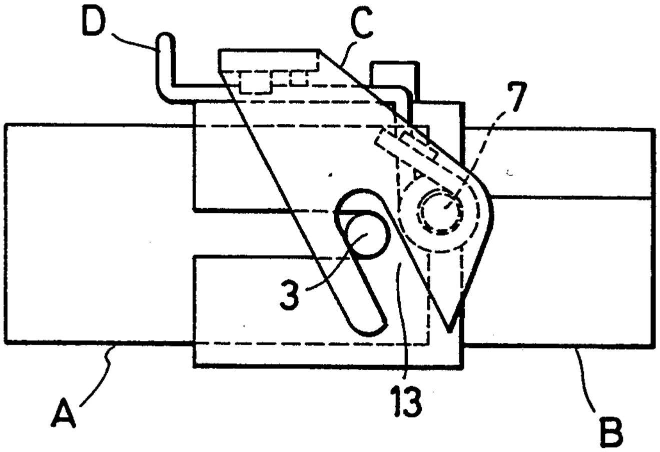
FIG. 2B is a side view illustrating how these connectors are completely mated with each other.

Mating and disconnection of the male and female connectors will now be described. As shown in FIG. 2A, when the male connector A is inserted into the hood 5 of the female connector B, the cam pins 3 move along the pin guide grooves 6 into the cam grooves 13, and then engage with the grooves 13. At this time, the male and female terminals mentioned above have either slight or no contact with each other. The male connector A is slightly mated with the female connector B (initial mating). The link plate 15 of the lever member C is moved toward the hood 5, thereby rotating the levers 11 in a direction opposite to that of the arrow P. This operation draws the male connector A toward the female connector B because of the cam grooves 13 engaging with the cam pins 3. FIG. 2B shows the male and female connectors A and B when they are completely mated with each other. Because of the operation of the lever member C, these connectors are mated with each other by a small amount of force. The above-described operations are the same as those of conventional connectors with a lever.

Figure 3A:
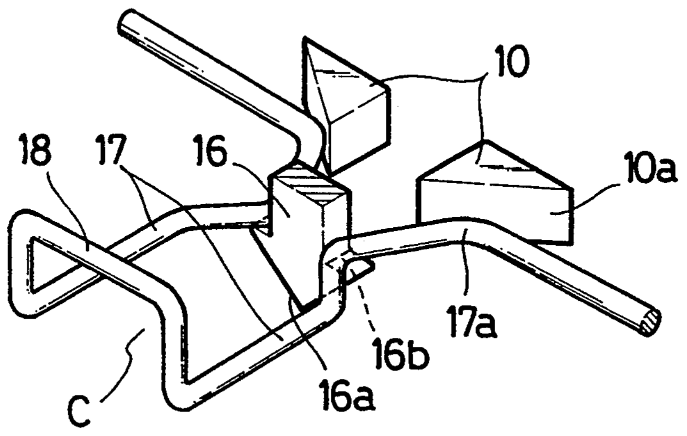
FIG. 3A is an enlarged view illustrating how a locking member shown in FIG. 1 is locked.
Figure 4A:
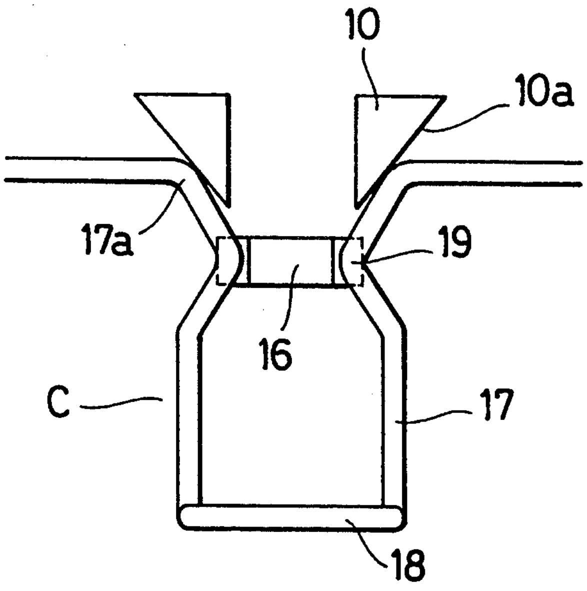
FIG. 4A is a plan view corresponding to FIG. 3A.

When the lever member C is rotated to move the link plate 15 toward the hood 5, tapered portions 16*a* at the edge of the lock piece 16 come into contact with the lock spring portions 19 and 19 on the window 9, and then enter between the lock spring portions 19 and 19 into the window 9 while they are elastically widening the gap between the lock spring portions 19 and 19. When the lever member C is rotated until it comes to a locked position, that is, when the link plate 15 reaches the position where it is in contact with the hood 5 (when the male and female connectors A and B are completely mated with each other), as shown in FIGS. 3A and 4A, the tapered portions 16*a* of the lock piece 16 pass the lock spring portions 19, and because the elastic return of the lock spring portions 19, shoulder portions 16*b* of the lock piece 16 come to engage with the lock spring portions 19, thereby locking the lever member C. In this way, mating and locking operations of the male and female connectors A and B can be accomplished by rotating the lever member C.

Figure 3B:
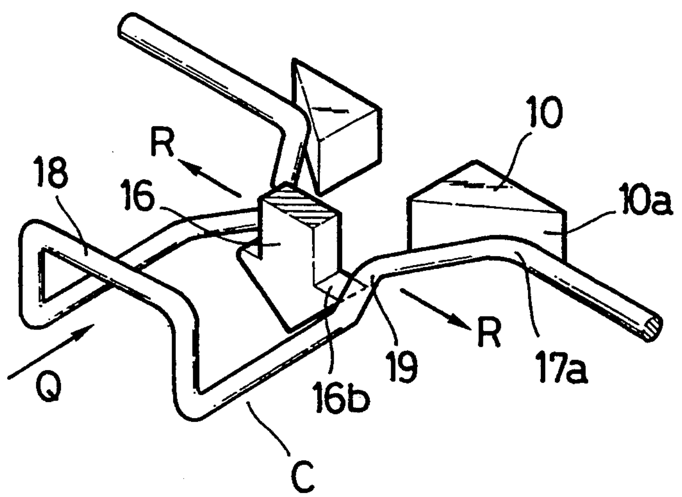
FIG. 3B is an enlarged view illustrating how this locking member is released.
Figure 4B:
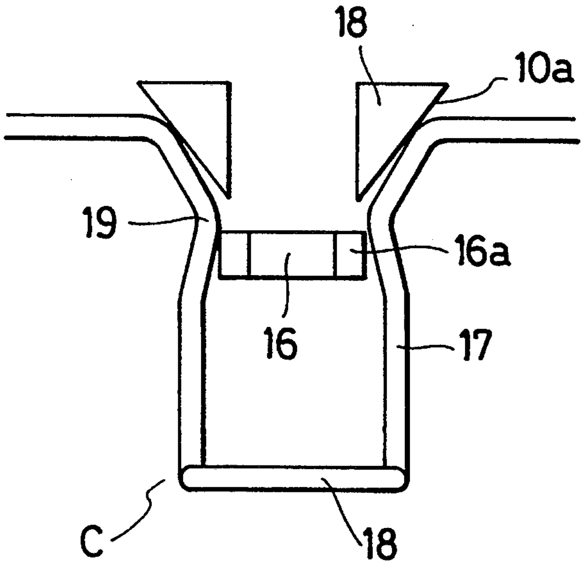
FIG. 4B is a plan view corresponding to FIG. 3B.

The male and female connectors A and B are disconnected, and the lock of the lever member C is released in the following manner. As shown in FIGS. 3B and 4B, when the operational portion 18 is pushed with the finger tip as indicated by the arrow Q, the elastic locking member D elastically retreats, and the tapered surfaces 10*a* of the spring guides 10 widen the bent portions 17*a*. This outwardly widens the lock spring portions 19 and 19 as indicated by the arrows R. Since the lock spring portions 19 and 19 expand beyond the position of the shoulder portions 16*b* and 16*b* of the lock piece 16, the lever member C is released from the lock piece 16. Under such conditions, when the lever member C is rotated in the direction of P as viewed in FIG. 2A, the male connector A is disconnected from the female connector B by the operation of the lever. If the finger tip is moved from the operational portion 18 after the lock of the lever member C has been released, the elastic locking member D elastically returns to its original position. The lever member C is urged by the reverse spring portions 20, engaging with the stopper 14, toward the direction indicated by the arrow P, and is retained in the position shown in FIG. 2A after the male and female connectors A and B have completely been disconnected.

Figure 5:
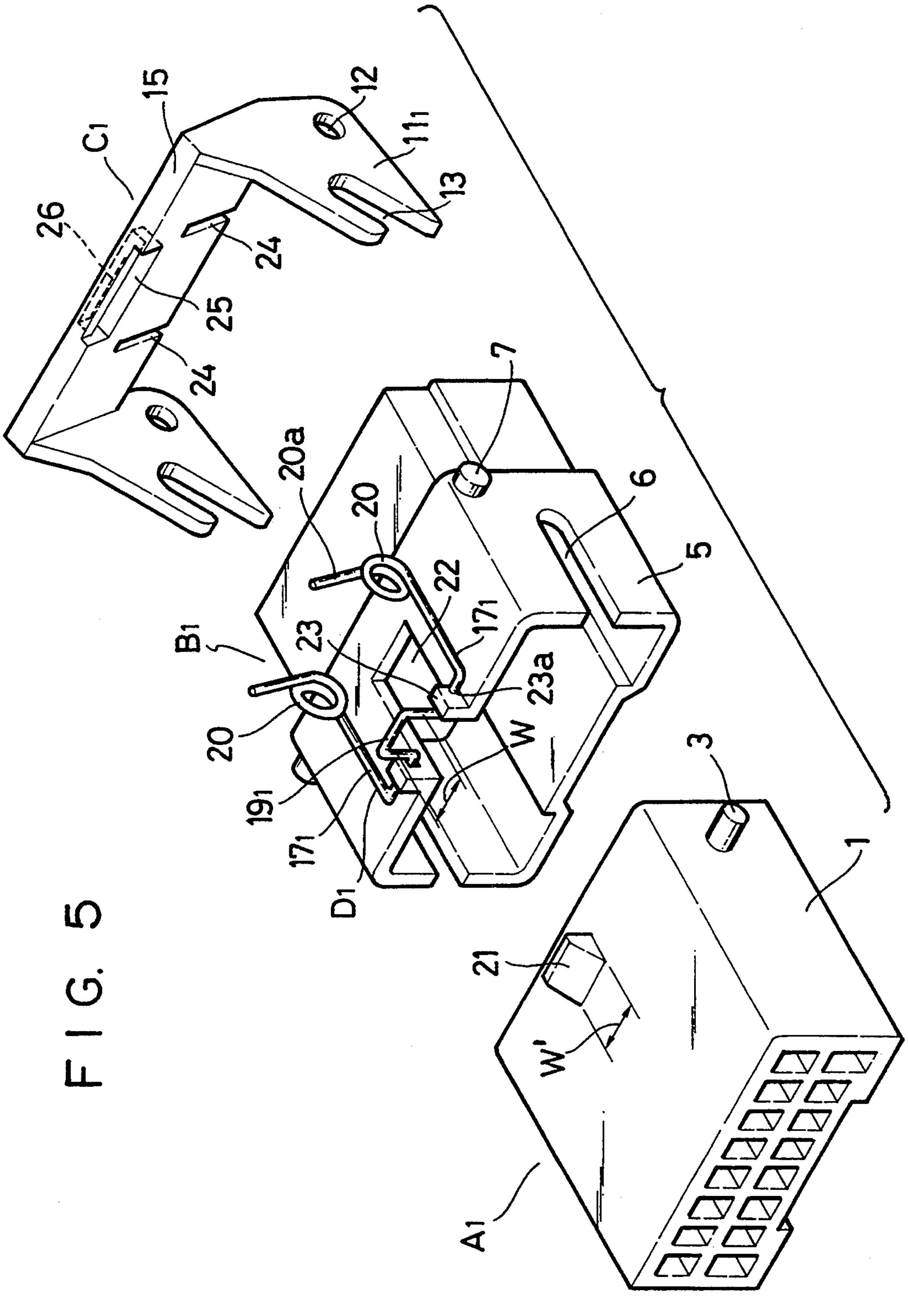
FIG. 5 is an exploded perspective view essentially showing a second embodiment of connectors with a lever.

FIGS. 5 through 7 show a second embodiment of this invention. In FIG. 5 lock releasing piece 21 projects from the upper outer surface of a housing 1 of a male connector $A_1$. A guide groove 22 corresponding to the lock releasing piece 21 is foraged in a hood 5 of a female connector $B_1$. Hook-like spring-retaining portions 23 are raised on both sides of the open end of the guide groove 22. An elastic locking member $D_1$, like the elastic locking member D mentioned above, is made of an elastic metal wire. It has a lock spring portion $19_1$ which projects forming an inverted U, and reverse spring portions 20 on both sides of the hood 5. The width W of the lock spring portion $19_1$ is slightly wider than the width W' of the lock releasing piece 21. Leg portions $17_1$ on both sides of the lock spring portion $19_1$ are caught in recesses 23a in the spring-retaining pore ions 23 and are retained therein. Springs 20a of the reverse spring portions 20 are secured to reception-grooves 24 formed in the undersurface of a link plate 15 of a lever member $C_1$. The lock spring portion $19_1$ serves as an operational portion 18, as described later. A lock window 25 having a lock nib 26 is formed in the link plate 15 of the lever member $C_1$. The lock nib 26 engages with the lock spring portion $19_1$, and serves as a lock portion.

Figure 6A:
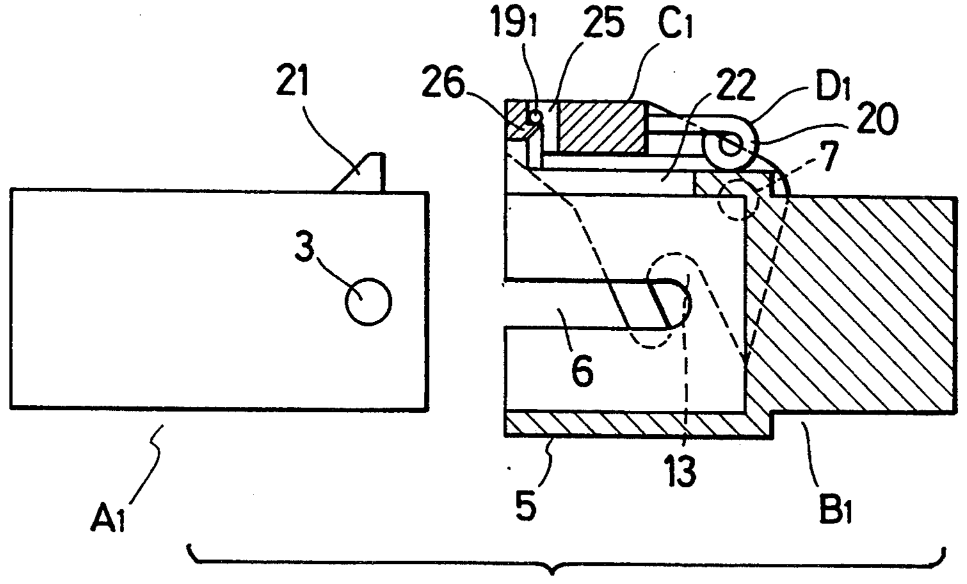
FIG. 6A is a side view illustrating how male and female connectors shown in FIG. 5 are disconnected from each other.
Figure 6B:
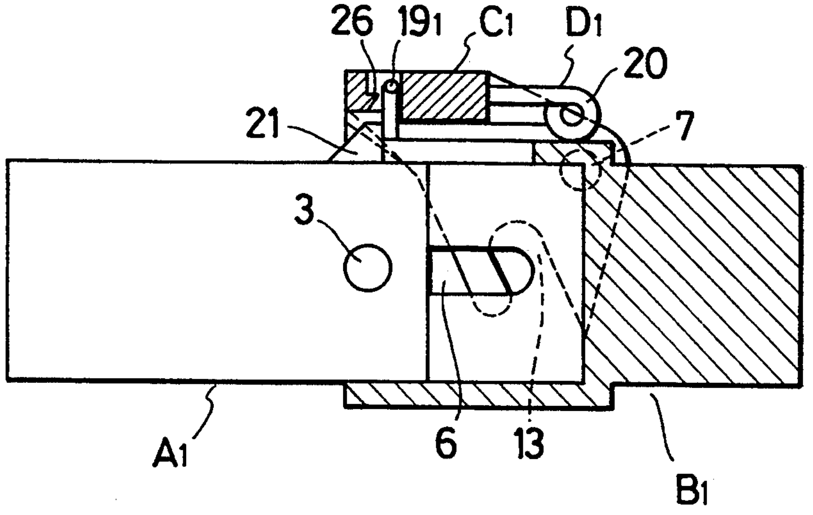
FIG. 6B is a side view illustrating how these connectors are mated with each other in an initial stage.
Figure 7A:
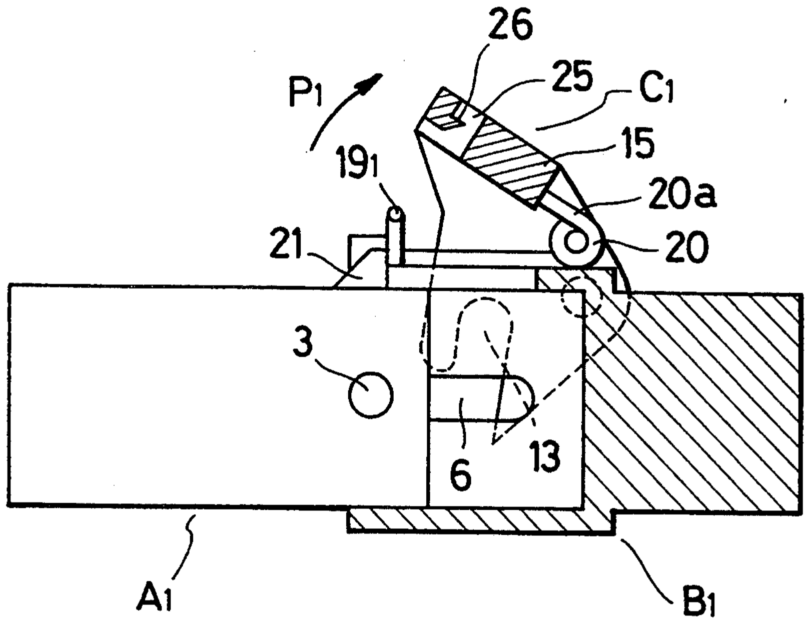
FIG. 7A is a side view illustrating how a locking member shown in FIGS. 6A and 6B is released.
Figure 7B:
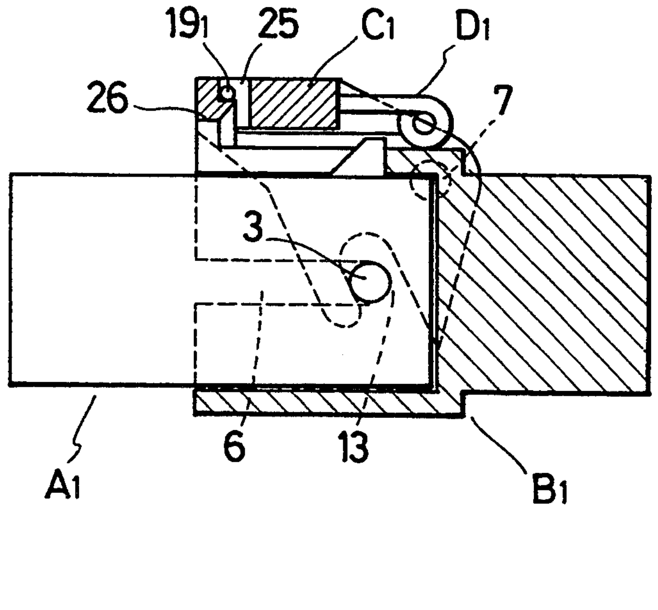
FIG. 7B is a side view illustrating how this locking member is locked.

As shown in FIG. 6A, when the lever member $C_1$ is pressed rotatively and downwardly against a rebound force acting on the reverse spring portions 20 of the elastic locking member $D_1$, the lock spring portion $19_1$ retained by the spring-retaining portions 23 engages with the lock nib 26 of the lock window 25, and the lever member $C_1$ is thereby locked by the female connector $B_1$. Under such conditions, when the male connector $A_1$ is inserted into the hood 5 in the same manner as described previously, the lock releasing piece 21 advances into the guide groove 22, and then engages with the lock spring portion $19_1$, as shown in FIG. 6B. This operation slightly retreats the lock spring portion $19_1$ and disengages it from the lock nib 26. Consequently, as shown in FIG. 7A, the lever member $C_1$ is urged by the reverse spring portions 20 toward the direction of the arrow $P_1$, and is released. This state is the same as the state in which the male and female connectors A and B of the first embodiment shown in FIGS. 1 and 4B are initially mated with each other. When the lever member $C_1$ is rotated in a direction opposite to the direction of the arrow $P_1$, as shown in FIG. 7B, the male and female connectors $A_1$ and $B_1$ are completely mated with each other, and the lock spring portion $19_1$ again engages with the lock nib 26 in the lock window 25, thereby locking the lever member $C_1$. The lock of the lever member $C_1$ can be easily released by pressing the lock spring portion $19_1$ backwardly with, for example, the finger tip .

Figure 8:
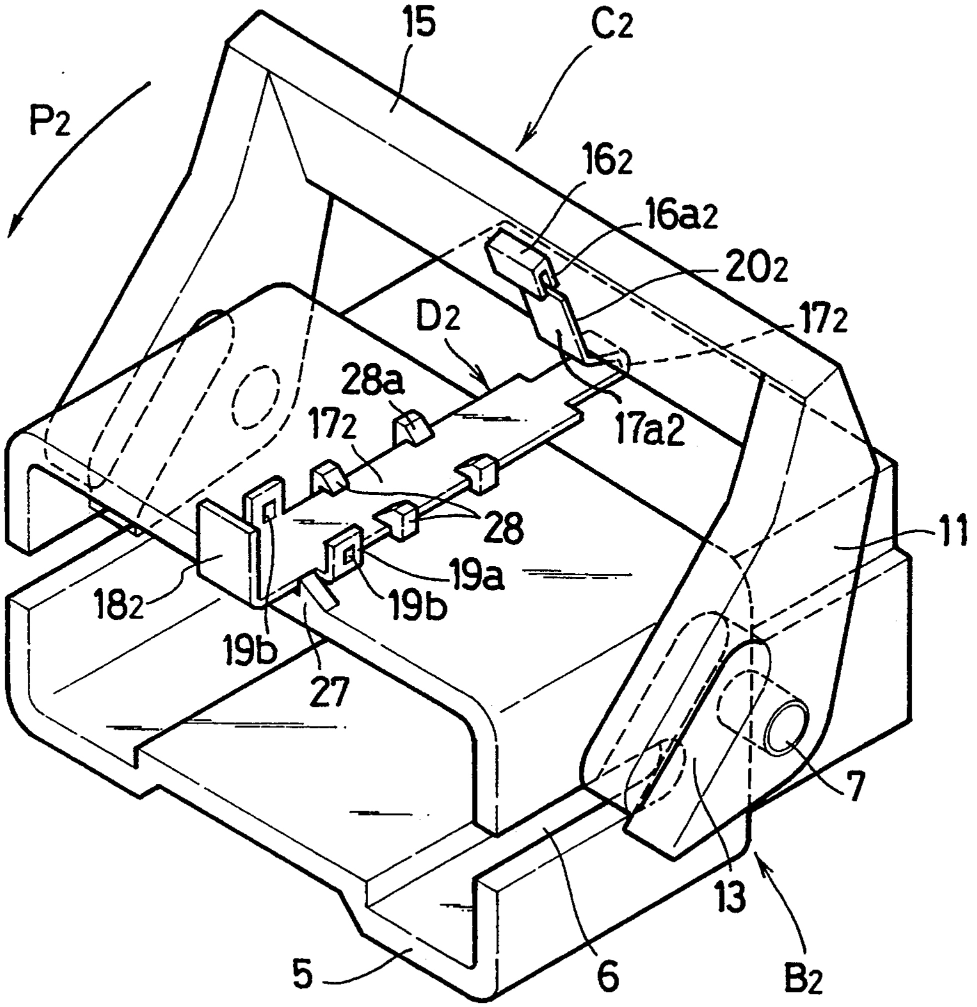
FIG. 8 is a perspective view essentially showing a third embodiment of connectors with a lever.
Figure 9:
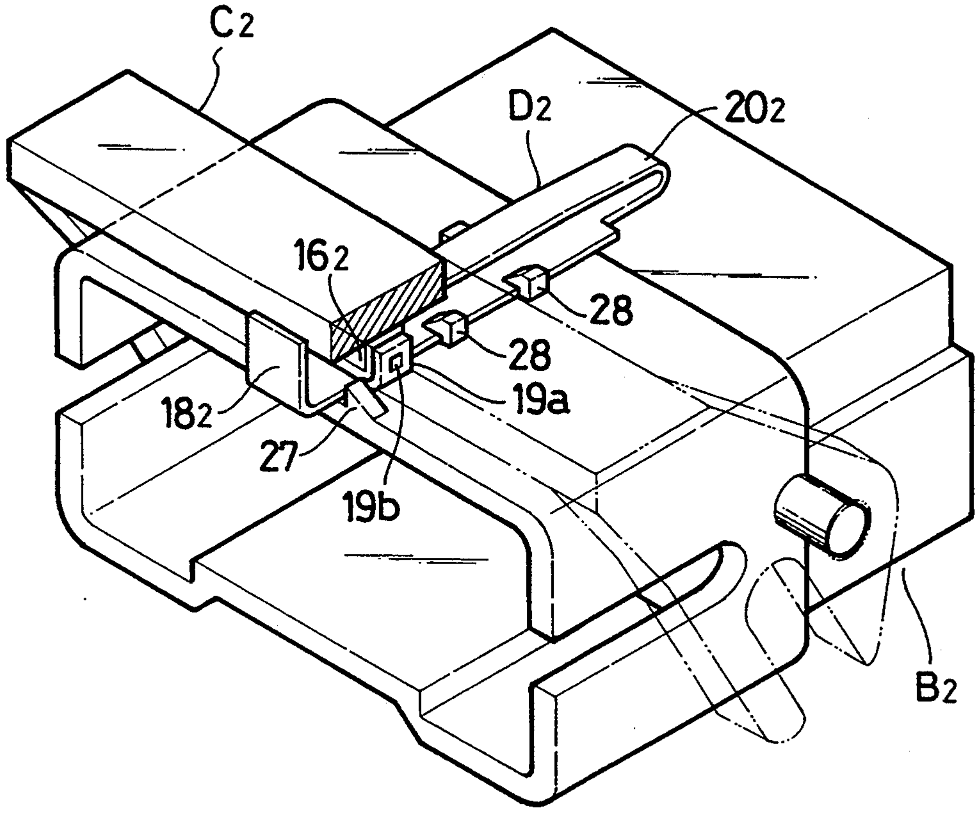
FIG. 9 is a perspective view illustrating how a locking member shown in FIG. 8 is locked, a portion of the view being cut way.

FIGS. 8 through 10 show a third embodiment of this invention. In FIG. 8, an elastic locking member $D_2$ is mounted on the upper outer surface of a hood 5 of a female connector $B_2$ so that it is capable of sliding in a direction in which connectors are mated with each other. The elastic locking member $D_2$ is constructed in the following manner: One end of an elastic metal strip $17_2$ is bent upwardly, thus serving as an operational portion $18_2$. A pair of side pieces 19a and 19a serving as lock spring portions, each having a nib 19b, are raised on both sides of the metal strip $17_2$. A reverse spring portion $20_2$ which is bent upwardly at a bent portion $17a_2$ is formed at the other end of the metal Strip $17_2$. A pair of facing motion-preventing projections 27 are formed on the upper outer surface of the hood 5. Two pairs of facing spring-pressing arms 28 and 28 project from the upper outer surface of the hood 5. These spring-pressing arms 28, each having a tapered surface 28a, are formed so as to have flexibility. The elastic locking member $D_2$ is forcibly pressed against the tapered surfaces 28a, and thus loosely retained by the pair of the motion-preventing projections 27 and the two pairs of the spring-pressing arms 28. The elastic locking member $D_2$ is capable of sliding while it is guided by these members. A lock portion $16_2$ having grooves $16a_2$ projects from the undersurface of a link plate 15 of the lever member $C_2$. The grooves $16a_2$ engage with the nib 19. The end of the reverse spring portion $20_2$ is in elastic contact with the undersurface of the link plate 15 .

Figure 10A:
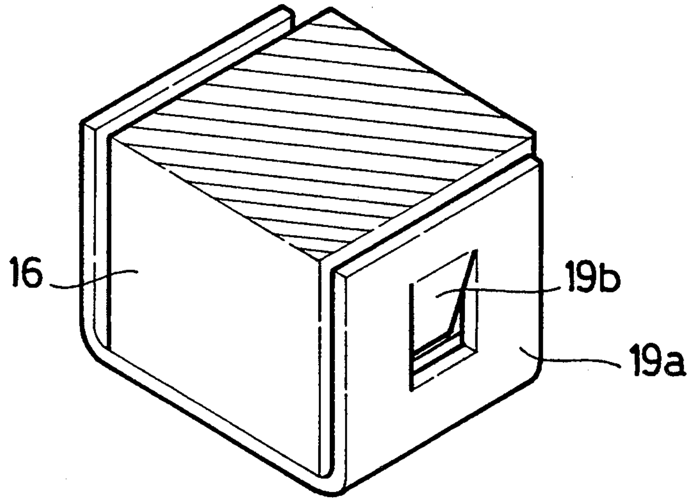
FIG. 10A is a perspective view illustrating how the locking member shown in FIG. 9 is locked.
Figure 10B:
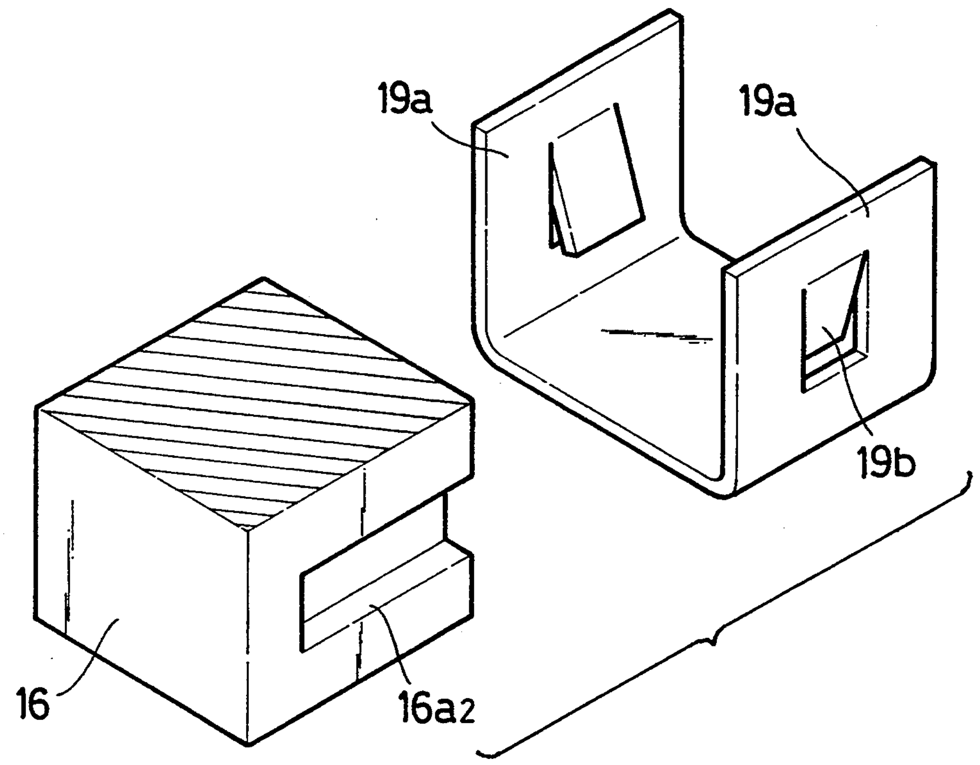
FIG. 10B is a perspective view illustrating how this locking member is released.

When the lever member $C_2$ is rotated in a direction indicated by the arrow $P_2$ as viewed in FIG. 8, as shown in FIGS. 9 and 10A, the nibs 19b of the elastic locking member $D_2$ engage with the grooves $16a_2$ of the lock portion $16_2$, thereby locking the lever member $C_2$. Under this condition, when the finger tip presses the operational portion $18_2$ of the elastic locking member $D_2$, the strip $17_2$ retreats. The positions of the nibs 19b and the lock portion $16_2$ shift, as shown in FIG. 10B. Thus, the nibs 19b disengage from the grooves $16a_2$, and the lever member $C_2$ is retained in a released position by a force acting on the reverse spring portion $20_2$ in the same manner as in FIGS. 2A and 7A. After the lock of the lever member $C_2$ has been released, the operational portion $18_2$ is drawn by the finger tip toward the operator to return it to the original position. By rotating the lever member $C_2$, the male and female connectors are mated with and disconnected from each other in the same manner as in the first and second embodiments, and a description of such operations is omitted.

As has been described above, according to this invention, an elastic locking member is utilized in which the lock spring portion and the reverse spring portions are integrally formed to lock or release the lever. The number of components and processes for assembling them are therefore decreased, and the trouble of controlling the components is reduced. By rotating the lever, the male and female connectors can be completely mated with each other and the lever locked simultaneously. Thus, one operation suffices to accomplish the above mating and locking operations, improving workability.

What is claimed is:

1. A connector system comprising:

a first connector;

a second connector coupled to said first connector, said second connector having at least one guide member projecting therefrom;

a lever pivotably mounted to said first connector and movable between an open position and a closed position, said lever including at least one guide groove for capturing said at least one guide member in the closed position, and a locking catch member for maintaining said closed position; and a unitary elastic locking member disposed between said lever and said first connector and having a spring portion engaging and outwardly biasing said lever into said open position and a locking clasp portion integral to said spring portion and engaging said locking member of said lever for maintaining said closed position;

wherein said first and second connectors are coupled by mating said connectors and pivoting said lever toward said closed position, thereby pulling said second connector further toward said first connector, until the locking clasp portion of said elastic locking member engages said locking catch member of said lever to maintain said closed position, and wherein said first and second connectors are uncoupled by disengaging the locking clasp portion of said elastic locking member from said locking catch member of said lever, said spring portion of the elastic locking member thereby biasing said lever into said open position for withdrawal of said first and second connectors.

2. The connector system of claim 1, wherein said elastic locking member further has an integral release portion that may be pressed in order to elastically deform said elastic locking member, thereby causing said locking clasp portion to disengage said locking catch member.

3. The connector system of claim 1, wherein said elastic locking member comprises an elastic wire.

4. The connector system of claim 3, wherein said elastic wire is bent into a generally "U" shape with opposing legs, each said opposing leg having a coiled portion at a free end thereof that forms said spring portion.

5. The connector system of claim 4, wherein said opposing legs of said elastic wire are bent inwardly at opposing intermediate portions thereof such that a gap is formed between the inwardly bent portions for receiving said locking catch member of said lever, said inwardly bent portions forming said locking portion.

6. The connector system of claim 5, wherein said elastic locking member further has an integral release portion that may be pressed in order to elastically deform said elastic wire, thereby causing said inwardly bent portions to bend outwardly and disengage said locking catch member, said integral release portion being formed in a central region of said wire where said opposing legs join and having a substantially "U" shape.

7. The connector system of claim 4, wherein said elastic wire is further bent into a substantially "U" shape in a central region of said wire where said opposing legs join, said U-shaped region lying substantially in a plane that is angled with respect to a plane in which both opposing legs substantially lay.

8. The connector system of claim 7, wherein said locking catch member is positioned on said lever such that it engages said U-shaped region of said elastic wire when pivoted into a closed position, said U-shaped region thereby defining said locking clasp portion.

9. The connector system of claim 7, wherein said second connector is provided with a lock releasing piece that projects from an outer wall thereof, and said first connector is provided with a groove for guiding said lock releasing piece when said connectors are coupled such that said lock releasing piece engages said U-shaped region and deflects said U-shaped region, thereby disengaging said U-shaped region with said locking catch member.

10. The connector system of claim 1, wherein said elastic locking member comprises an elastic plate.

11. The connector system of claim 10, wherein said locking clasp portion comprises at least one side plate extending from said elastic plate and having at least one projection that lockingly engages said locking catch member when said lever is pivoted to said closed position.

12. The connector system of claim 11, wherein one end of said elastic locking member is bent at an angle, thereby defining a lock release portion that may be pressed in order to slide said elastic locking member, thereby releasing said locking catch member of said lever from engagement with said projection.

* * * * *